W. E. WARD.
CALK ATTACHMENT FOR HORSESHOES.
APPLICATION FILED DEC. 9, 1908.

988,525.

Patented Apr. 4, 1911.

WITNESSES:
David J. Walsh.

INVENTOR
WILLIAM EDWIN WARD,
BY
ATTORNEY

UNITED STATES PATENT OFFICE.

WILLIAM EDWIN WARD, OF NEW YORK, N. Y.

CALK ATTACHMENT FOR HORSESHOES.

988,525.  Specification of Letters Patent.  Patented Apr. 4, 1911.

Application filed December 9, 1908. Serial No. 466,623.

*To all whom it may concern:*

Be it known that I, WILLIAM EDWIN WARD, a citizen of the United States of America, residing in the borough of Brooklyn, in the city and State of New York, have invented a new and useful Calk Attachment for Horseshoes; and I do hereby declare the following to be a full, clear, and exact description of the same.

This invention relates to devices, readily secured to and disengaged from the hoof of a horse or a shoe fastened thereto, and the improvements consist, especially, in providing self-adjusting means whereby the device may be applied to hoofs or horseshoes of several sizes.

Figure 1:
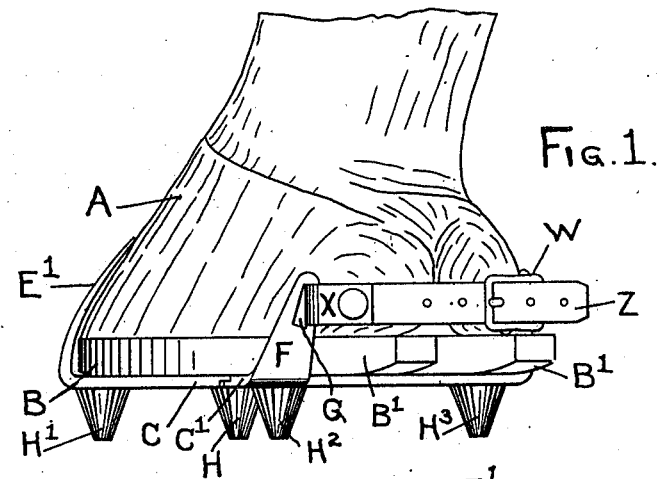
Figure 2:
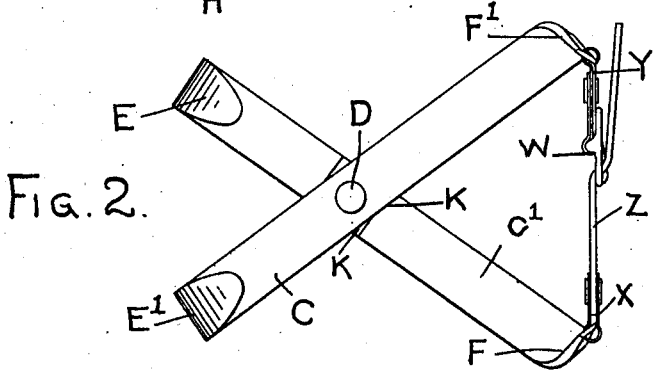

Referring to the accompanying drawings, Figure 1 shows, in side and rear view, one form of my invention secured to the hoof of a horse; Fig. 2 is a top view, showing the attachment removed and in the position assumed when gripping a hoof; and Fig. 3 a top view, showing such attachment in open position.

In Fig. 1, A indicates the hoof of a horse and B indicates a shoe attached thereto.

The attachment consists of a frame or other body having relatively-movable bars C and $C^1$, which may, as shown in the drawings, cross one another and be pivoted together, by pivot D at their intersection. One of the bars ($C^1$, in the drawings) may be provided with a recess, K, which is slightly longer than the width of the other bar, in order that the relative movement of said bars shall be limited. At their forward ends, each bar is provided with an upwardly and rearwardly-extending hook (E, $E^1$), and at their rear ends, said bars are provided with upwardly-extending projections (F, $F^1$).

The attachment is provided with calks in any of the known ways, and the calks may, as shown in the drawings, be arranged so as to have $H^1$ and $H^3$ extend downwardly from near the front and rear ends of the bars C, and the calks $H^2$ and H similarly disposed relatively to bar $C^1$.

Each projection F (or $F^1$) is shown as provided with a loop-engaging opening, G, which (Fig. 1) is preferably triangular in form, to permit a strap to lie flat across the back of a hoof, as hereinafter described. Each opening is engaged by a loop (X, Y) of metal or other material, which connect, respectively, with a buckle W having a tongue, and with a strap Z, of any material, provided with holes for engagement by said tongue.

Figure 3:
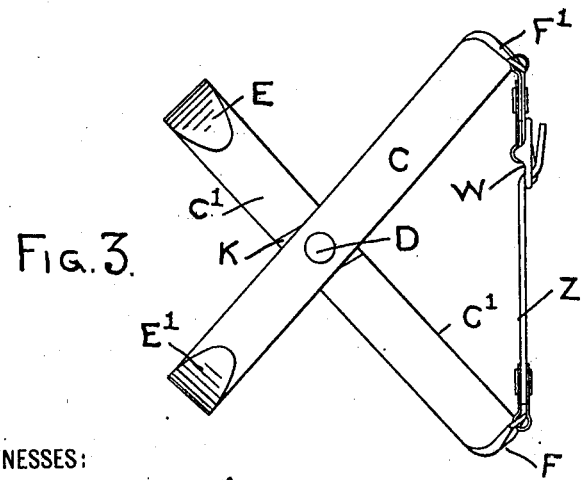

When desiring to apply the attachment to a hoof, the strap is loosened and the bars are spread, as shown in Fig. 3, so as to have the gripping parts, E and $E^1$, their full distance apart. The attachment is then fitted upon the hoof and shoe, and the strap is pulled until the hooks E and $E^1$ engage the hoof at its front and the projections F and F closely engage the rear ends of the horseshoe.

It will be noted that the attachment is a complete article of manufacture, ready to be sold as such, which will fit various sizes of hoofs, and can be immediately attached to or disengaged from any hoof.

What I claim is:

1. A calk attachment, consisting of bars crossing one another and pivoted together at their intersection, each bar provided with a hoof-engaging means at its forward end and with gripping means at its rear end and each bar provided with a calk, in combination with means for drawing all said hoof-engaging means against or releasing them from a hoof and to a horseshoe secured thereto.

2. In a removable calk for horseshoes, the combination with a horseshoe, of two horizontally reciprocating calk-supporting plates crossed and pivotally secured at the centers, the forward portion of each of said plates being oppositely disposed to the heel portion thereof, a plurality of vertically disposed clamps attached to said plates to adjustably engage said horseshoe along its outer surface, and means for locking the clamps on said plates to said horseshoe, substantially as described.

In testimony whereof, I have signed my name to this specification in the presence of the subscribing witnesses.

WILLIAM EDWIN WARD.

Witnesses:
R. M. DE TASSELLE,
MORRIS JACOBS,
LORLYS ELTON ROGERS.

---

Copies of this patent may be obtained for five cents each, by addressing the "Commissioner of Patents, Washington, D. C."